Oct. 31, 1933.     H. C. KLUG     1,932,526
CONTROL FOR LATHE DRIVES
Filed May 2, 1932
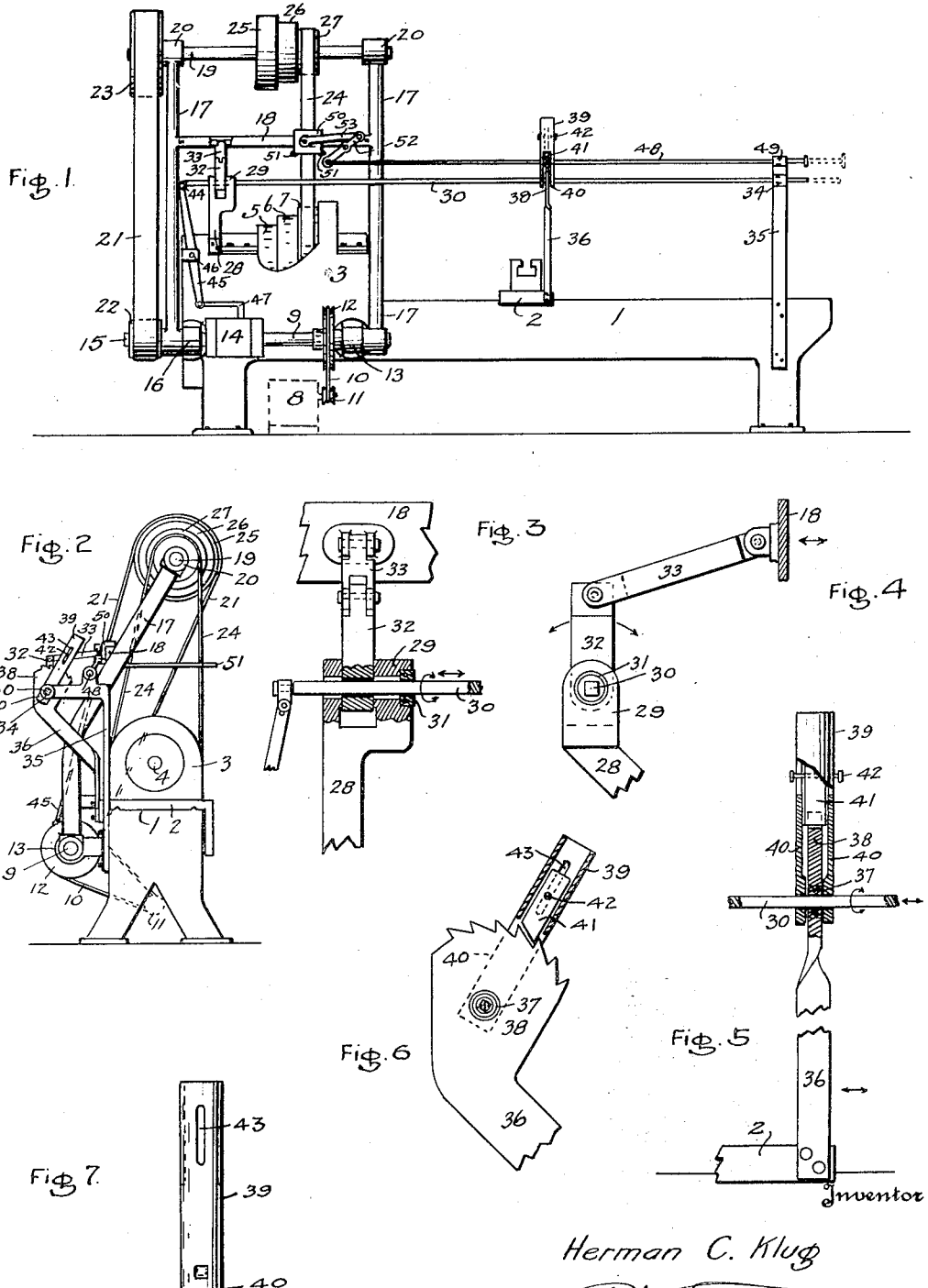
Inventor
Herman C. Klug
By
Attorney

Patented Oct. 31, 1933

1,932,526

UNITED STATES PATENT OFFICE 1,932,526

CONTROL FOR LATHE DRIVES

Herman C. Klug, Tacoma, Wash.

Application May 2, 1932. Serial No. 608,742

7 Claims. (Cl. 74—217)

This invention relates to lathes and especially to the means for controlling the drive thereof, and has for its objects to provide a means, mounted on the clutch shaft and swingable thereabout, whereby the drive belt between the countershaft and the lathe spindle may be tightened or loosened as desired; to provide means, connected to the lathe carriage, whereby said belt-tension control may be operated; to provide means whereby the belt may be shifted from one pair of pulleys to another to change the rate of rotation of the lathe spindle; and to provide means for reversing the direction of rotation of the lathe, said means being combined with the operating means of said belt-tension control. Further objects are to provide such a mechanism as is very simple to make, in which standard piping and fittings may be used, and which is strong, rugged, and effective in use.

I attain these and other objects by the devices, mechanisms, and arrangements illustrated in the accompanying drawing, in which—

Fig. 1 is a rear elevation of a lathe equipped with my apparatus; Fig. 2 is an end elevation thereof; Figs. 3 and 4 are a rear elevation, partly broken away to reveal the construction, and a side elevation, respectively, of the link mechanism whereby the tension of the belt is controlled; Fig. 5 is a rear elevation of the operating means for said belt tension control and reversing control, showing its connection to the lathe carriage; Fig. 6 is a side elevation, partly in section, showing the ratchet handle mechanism whereby said belt tension control is operated; and Fig. 7 is a side elevation of the handle thereof, removed from the machine.

Similar numerals of reference refer to similar parts throughout the several views.

Referring to the drawing, it will be seen that the lathe is of any suitable construction and is provided with the usual bed 1, on which the tool carriage 2 is mounted, and is driven in the usual way, and a drive head 3 mounting the usual lathe spindle 4 and the set of pulleys 5, 6 and 7 of different diameters and adapted to drive the spindle 4. A suitable electric motor 8, or other suitable actuating means, is mounted under the lathe bed 1 and drives the clutch shaft 9 by means of the belt 10 connecting the pulleys 11 and 12, mounted on the said motor 8 and on the said clutch shaft 9, respectively. The clutch shaft 9 is mounted in a bearing 13, extending out from the rear of the lathe bed 1, and is connected to a reversing clutch 14 which may be of any approved type. The driving shaft 15, which extends out from the reversing clutch 14 is mounted in a bearing 16 and forms a coaxial extension of the driven clutch shaft 9, and is provided with a drive pulley at its end. Thus the shaft 9 is driven in a constant direction and speed by the motor 8 but the shaft 15 and its pulley may rotate in either direction.

A swinging frame, comprising the two side members 17, connected together at a point about one-third of their length down by the cross-piece 18, is provided. These frame members 17 are journalled on the above-described concentric shafts 9 and 15, and carry the lathe countershaft 19 on their upper ends in suitable bearings 20. The countershaft 19 is driven in either direction from the extension shaft 15 by means of a belt 21 passing over the pulleys 22 and 23 mounted on the said shafts 15 and 19, respectively. The countershaft 19 drives the lathe spindle 4 by means of the belt 24 which passes over the set of pulleys 25, 26 or 27, on the countershaft 19, and the complementary set of pulleys 5, 6 or 7 on the said spindle 4, in the usual manner. The speed at which the spindle 4 is thus driven depends on whether the said belt 24 connects the pulleys 5 and 25, or 6 and 26, or 7 and 27.

As readily seen in Fig. 2 of the drawing, the concentric shafts 9 and 15 are positioned below and to the rear of the spindle 4 of the lathe and, as above described, these concentric shafts 9 and 15 form the axis about which the frame 17 may be freely turned. Therefore, any adjustment of the frame 17 about the axis of the shafts 9 and 15, will cause the countershaft 19 to be moved at a greater or less distance from the spindle 4 and will, therefore, adjust the tension in the belt 24. However, since the belt 21 passes around the pulley 22 on the shaft 15, it follows that such above-described adjustment of the frame 17 about its axis of rotation will not in any manner affect the tension of the belt 21.

The adjustment of the position of the frame 17 and of the tension of the belt 24, is attained by mechanism shown in Figs. 3 and 4. The head 3 of the lathe has a bracket 28 extending up from its rear side, said bracket having a bifurcated head 29 at its upper end. A square control bar 30 passes through the head 29 of the said bracket, being mounted in a suitable bearing 31 therein in such manner that the bar 30 may be rotated in the said bearing or may be slid axially therein. A lever 32 is mounted on the said control bar 30, between the tines of the bracket head 29. The said bar 30 passes through a square hole in the end of the lever 32 so that a rotation of the bar 30 about its axis will cause the lever 32 to revolve about the axis of the bar. A link 33 joins the end of the lever 32 to the cross piece 18 of the frame so that a rotation of the bar 30 will cause an adjustment of the position of the frame and therefore will loosen or tighten the belt 24.

As shown in Fig. 1, the control bar 30 extends substantially the full length of the lathe, its inner end is supported by the bearing 31, as above described, and its outer end is loosely supported by a bearing 34 in the bracket 35 secured to the rear side of the outer end of the lathe.

The tool carriage 2 carries an intermediate bracket 36. Referring now especially to Figs. 5, 6 and 7, it will be seen that the control bar 30 passes freely through the bearing 37 mounted in the bracket 36 and may be rotated therein, or moved axially therein, and that the bracket 36 may slide along the said bar 30 with the movements of the tool carriage 2 on the lathe bed 1. A ratchet quadrant 38, with suitable teeth thereon, is formed on the end of the bracket 36. A hollow operating handle 39 is mounted on the square control bar 30 and is provided with tines 40, positioned on each side of the quadrant 38. The control bar 30 passes loosely through the square holes in the tines 40 so as to permit a lateral motion but to prevent any relative rotation between the handle and the bar 30. A ratchet dog 41 is mounted on the inside of the handle 39 and is adapted to extend down therein into locking engagement with the teeth of the quadrant 38. The dog 41 has a horizontal pin 42 which extends through the longitudinal slots 43 in the sides of the handle 39. Therefore, if the dog 41 is raised by gripping the pin 42, out of engagement with the teeth of the quadrant 38, the handle 39 may be rotated to cause the control bar 30 to be rotated to adjust the position of the swing frame 17 and the tension of the belt 24 and, when so adjusted, the dog 41 will hold the bar, the frame, and the belt in such adjusted condition.

The inner end of the control bar 30 (Figs. 1 and 3) is connected by a suitable fitting 44 to a lever 45, pivoted at 46 to the rear of the lathe. The other end of this lever 45 connects with the control rod 47 of the reversing clutch, indicated at 14, to that axial motion of the square control bar 30 will throw the connection between the shafts 9 and 15, to reverse the direction of rotation of the said shaft 15.

Thus it will be seen that a rotary motion of the bar 30 controls the tension of the belt 24 and an axial motion thereof controls the direction of rotation of the lathe spindle 4.

A second control bar 48 is loosely mounted, at its outer end, in a bearing 49 on the end of the bracket 35, above described, and is adapted to be moved axially in order to control the position of the belt 24 to engage one or another of the three pairs of pulleys 5 and 25, 6 and 26, and 7 and 27. A slide 50 is mounted on the cross piece 18 of the swing frame 17 and carries the belt-engaging tines 51 which extend out therefrom towards the front of the lathe and respectively engage the two edges of the belt 24. This slide 50 is adapted to be moved laterally on the cross piece 18 by means of a lever 52, pivotally mounted on the cross piece 18 and having one end connected to the said slide 50 by means of a link 53, and having its other end secured to the inner end of said control bar 48. Since the bar 48 is loosely mounted in the bearing 49 and since such bearing is far removed from the swinging frame, there is ample allowance made to permit the frame to be adjusted, as above described, without clamping the bar 48 in its bearing.

My improved lathe control is operated in the following manner:—The lathe operator is normally standing adjacent to the tool carriage 2 of the lathe. If, then, he wishes to reverse the direction of rotation of the lathe spindle, he grasps the square bar 30 and moves it laterally, or axially, to actuate the lever 45 and reverse the gearing connection in the reversing clutch 14 between the shafts 9 and 15. If he desires to change the speed of the spindle 4, he first grasps the handle 39 and releases the dog 41 from the teeth of the quadrant 38 and thus permits the frame 17, with its countershaft 19, to swing forward and downward, about the center of the shafts 9 and 15, thus loosening the belt 24; then he grasps the other control bar 48 and moves it laterally, or axially, to actuate the lever 52 and thus to move the slide 50, laterally on the cross piece 18 and to bring the tines 51 thereof into action on the loosened belt 24 to move it on to the desired pair of pulleys 5 and 25, 6 and 26, or 7 and 27; he then again grasps the handle 39 and pushes it from him, thus turning the square bar 30 and operating the lever 32 to pull the frame 17 backward and upward, through the action of the link 33 and the cross piece 18, thus tightening the belt 24 on the said selected pair of pulleys. As the said handle 39 is pushed rearward the dog 41 engages the teeth of the quadrant 38 and holds the swinging frame 18 in such adjusted position.

It is evident that many variations in the details of construction may be made in the actual production of my improved lathe control, depending on the circumstances and the desires of the manufacturers and users thereof, without departing from the spirit of my invention as outlined in the appended claims, though I prefer to use standard piping and fittings in the construction thereof wherever practical or desirable.

Having, therefore, described my invention, what I claim and desire to secure by Letters Patent, is:—

1. In a control mechanism for a lathe having a traveling tool carriage, a fixed spindle, and a fixed drive shaft removed in position from the axis of said spindle; a swinging frame pivoted concentric with said fixed drive shaft; a countershaft mounted on said swinging frame; a belt operatively connecting said fixed drive shaft with said countershaft, whereby said countershaft is driven; a second belt connecting said countershaft with said spindle, whereby said spindle is driven; a fixed bracket mounted on the lathe; a lever mounted in said bracket and operatively connected to said swinging frame; a control bar passing through said bracket and adapted to be rotated therein and operatively connected to said lever; a second bracket mounted on and movable with said tool carriage and forming a movable support for said control bar; a handle lever slidably mounted on said control bar and adapted to be moved thereon by said second bracket and adapted to rotate said control bar; a ratchet-toothed quadrant formed on said second bracket; and a ratchet dog carried by said handle lever and engaging said ratchet teeth and adapted to hold said handle lever, control bar, and swinging frame in adjusted position.

2. In a control mechanism for a lathe having a fixed spindle and a fixed drive shaft removed in position from the axis of said spindle; in combination with a swinging frame pivoted concentric with said fixed drive shaft; a countershaft mounted on said swinging frame; a belt operatively connecting said fixed drive shaft with said countershaft, whereby said countershaft is driven; a second belt connecting said countershaft with said spindle, whereby said spindle is driven; a fixed bracket mounted on the lathe; a lever mounted in said bracket and operatively connected to said swinging frame; a control bar passing through said bracket and adapted to be rotated therein and operatively connected to said lever; and means for rotating said control bar, whereby the position of said swinging frame relative to the fixed spindle may be adjusted.

3. In a control mechanism for a lathe having a fixed spindle and a fixed drive shaft removed in position from the axis of said spindle; in combination with a swinging frame pivoted concentric with said fixed drive shaft, and carrying a countershaft together with two belts operatively connecting the countershaft with the drive shaft and the spindle, respectively; a fixed bracket mounted on the lathe; operative mechanism interposed between said fixed bracket and said swinging frame, whereby the position of said frame and countershaft relative to said spindle may be adjusted; and means for operating said adjusting mechanism.

4. In a control mechanism for a lathe having a fixed spindle and a fixed drive shaft removed in position from the axis of said spindle; in combination with a swinging frame pivotally supported coaxially with said fixed drive shaft; a countershaft mounted on the upper end of said swinging frame; a belt operatively connecting said fixed drive shaft with said countershaft; a second belt operatively connecting said countershaft with said fixed spindle; and adjustable means connecting the lathe with said swinging frame, whereby said frame may be swung on its pivots to tighten or loosen said second belt.

5. In a control mechanism for a lathe having a reversing mechanism, including a reversing lever pivoted to the lathe, and a swinging countershaft-supporting frame; in combination with a fixed bracket mounted on the lathe; a second lever mounted in said bracket and operatively connected to the swinging frame to adjust its position relative to the lathe; a control bar passing through said bracket and adapted to be rotated therein and to be slid axially therein, and passing through said second lever and adapted to be slid axially therein and operatively connected thereto, and operatively connected to said reversing mechanism lever to operate said first lever by means of its axial motion; and means adapted to rotate said control bar to operate said second lever to adjust the position of the countershaft-supporting swinging frame.

6. In a control mechanism for lathes as specified in claim 5, together with a traveling tool carriage on the lathe, and wherein said means to rotate said control bar comprises a second bracket attached to the tool carriage and forming a support for the control bar; and a handle lever slidably mounted on said control bar and moved thereon by said second bracket and adapted to rotate said control bar.

7. In a control mechanism for lathes as specified in claim 5, together with a traveling tool carriage on the lathe, and wherein said means to rotate said control bar comprises a second bracket attached to the tool carriage and forming a support for the control bar; a handle lever slidably mounted on said control bar and moved thereon by said second bracket and adapted to rotate said control bar; a ratchet-toothed quadrant formed on said second bracket; and a ratchet dog carried by said handle lever and engaging the ratchet-teeth of said quadrant, and adapted to hold said handle lever and control bar in adjusted position.

HERMAN C. KLUG.